United States Patent [19]

Hosier

[11] Patent Number: 5,493,423
[45] Date of Patent: Feb. 20, 1996

[54] RESETTABLE PIXEL AMPLIFIER FOR AN IMAGE SENSOR ARRAY

[75] Inventor: Paul A. Hosier, Rochester, N.Y.

[73] Assignee: Xerox Corporation, Stamford, Conn.

[21] Appl. No.: 330,940

[22] Filed: Oct. 28, 1994

[51] Int. Cl.[6] .............................. H04N 1/04; H04N 3/12; H04N 3/14

[52] U.S. Cl. .................. 358/482; 358/463; 348/241; 348/248; 348/294; 348/300

[58] Field of Search .................... 358/482, 463, 358/483, 446, 447; 348/241, 248, 250, 243, 249, 301, 300; 250/208.1; 327/563, 262, 142, 143

[56] References Cited

U.S. PATENT DOCUMENTS 4,805,025 2/1989 Akiyama et al. .............. 358/213.26
5,027,148 6/1991 Anagnostopoulos .................. 354/402
5,081,536 1/1992 Tandon et al. ..................... 358/213.31
5,142,286 8/1992 Ribner et al. ......................... 341/143
5,144,447 9/1992 Akimoto et al. .................. 358/213.11
5,172,249 12/1992 Hashimoto .............................. 358/482
5,311,319 5/1994 Moroi ...................................... 348/300
5,321,528 6/1994 Nakamura ............................... 358/482

Primary Examiner—Scott A. Rogers
Assistant Examiner—Fan Lee
Attorney, Agent, or Firm—R. Hutter

[57] ABSTRACT

In an input scanner for recording hard-copy images by exposing areas of the image to an array of photosensors, a system ensures sensor array uniformity. With each cycle of passing a discrete image signal through an amplifier associated with each photosensor, a low standby current is applied to certain transistors within the amplifier until the next signal is to be output. Critical nodes within the amplifier are caused to settle to known charge values before each image signal is passed therethrough.

8 Claims, 6 Drawing Sheets

RESETTABLE PIXEL AMPLIFIER FOR AN IMAGE SENSOR ARRAY

The present application incorporates by reference U.S. Pat. No. 5,081,536, assigned to the assignee hereof.

The invention relates to an image sensor array, and more particularly, to a system for ensuring sensor array uniformity by causing critical nodes within the amplifier associated with each sensor to settle to known charge values after each signal is passed therethrough.

Image sensor arrays typically comprise a linear array of photosites which raster scan an image bearing document and convert the microscopic image areas viewed by each photosite to image signal charges. Following an integration period, the image signal charges are amplified and transferred to a common output line or bus through successively actuated multiplexing transistors.

In the scanning process, bias and reset charges are applied to each photosite cell in a predetermined time sequence during each scan cycle. Where a two stage transfer circuit is provided with each cell for transferring the image signal charges from the photosites, the bias charge is applied to each photosite through a bias charge injection transistor coupled to a node between the photosite and the input to the two stage transfer circuit. However, even if the transistors between the photodiode in the photosite and its associated amplifier are reset with each scan cycle, the particular amplifier associated with the photosite, which includes any number of transistors within it, is not always similarly reset. The transistors within the amplifier may retain residual charges thereon between scan cycles, and the cumulative effect of these residual charges remaining within the amplifier could be a source of noise on the output signals coming out of the amplifiers. It is therefore desirable to provide a system in which not only are the transistors between the photodiode and the amplifier reset, but wherein the transistors within the amplifier itself are periodically reset to retain charges between each scan cycle of known value. In this way, the circuit elements particularly transistors, within each amplifier will start from known states with every scan cycle, and the amplifier itself will not become a source of noise.

U.S. Pat. No. 4,805,025 discloses a charge-coupled device (CCD) including a clamp circuit eliminating reset noise generated in an amplifier associated with the imager. A low-pass filter is provided in precedence to the clamp circuit to eliminate thermal noise of high frequency generated in the amplifier. The capacitance of a capacitor in the clamp circuit is set to a value greater than the input electrostatic capacity of the amplifier.

U.S. Pat. No. 5,027,148 discloses a CCD chip having normal photodiodes and "bright" diodes. A high voltage reference is produced from the full level of one of the bright diodes and used as the reference of a A/D converter. The high reference level is set each time the chip is enabled, in order to adapt the reference levels to environmental changes or changes due to manufacturing tolerances.

U.S. Pat. No. 5,142,286 discloses a photosensor wherein an analog output is supplied to a A/D converter having a filter which suppresses from the digital output signal a component arising from remnant wideband noise from a preamplifier.

U.S. Pat. No. 5,144,447 discloses a solid-state imaging device in which noise is prevented by compensating fluctuations in outputs of a large number of pixel amplifiers.

U.S. Pat. No. 5,321,528 discloses a multi-chip linear image sensor, each chip including photosensors and an output amplifier. To correct for offset error of the amplifier, each chip includes a circuit enabling the amplifier to be isolated so that its output can be sampled independently of the image signal. The sampled amplifier output is subtracted from the subsequent image signals.

According to one aspect of the present invention, there is provided a photosensor array comprising a plurality of photodiodes, with an amplifier associated with each photodiode. The amplifier includes a standby transistor and an internal node associated with the standby transistor. A transfer circuit is associated with each photodiode for transferring a charge on the photodiode to a reset node interposed between the photodiode and the amplifier. Serial readout means selectably cause an amplifier to output a charge from the reset node as an output signal. A reset voltage is applied to the reset node to reset the amplifier for transfer of a charge from the photodiode to the amplifier. A standby signal is applied to the standby transistor in the amplifier, the standby signal on the standby transistor causing the internal node to settle to a predetermined charge level before a subsequent transfer of a charge from the photodiode to the amplifier.

According to another aspect of the present invention, there is provided a method of operating a photosensor array including a plurality of photodiodes, an amplifier associated with each photodiode, the amplifier including a standby transistor and an internal node associated with the transistor, a transfer circuit associated with each photodiode for transferring a charge on the photodiode to a reset node interposed between the photodiode and the amplifier, and serial readout means for selectably causing an amplifier to output a charge from the node as an output signal. A reset voltage is applied to the reset node to reset the amplifier for transfer of a charge from from the photodiode to the amplifier. A charge on the photodiode is transferred to the reset node. A standby signal is applied to the standby transistor in the amplifier, the standby signal on the standby transistor causing the internal node to settle to a predetermined charge level before a subsequent transfer of a charge from the photodiode to the amplifier. The amplifier is caused to output a charge from the reset node as an output signal in response to the serial readout means.

Figure 1:
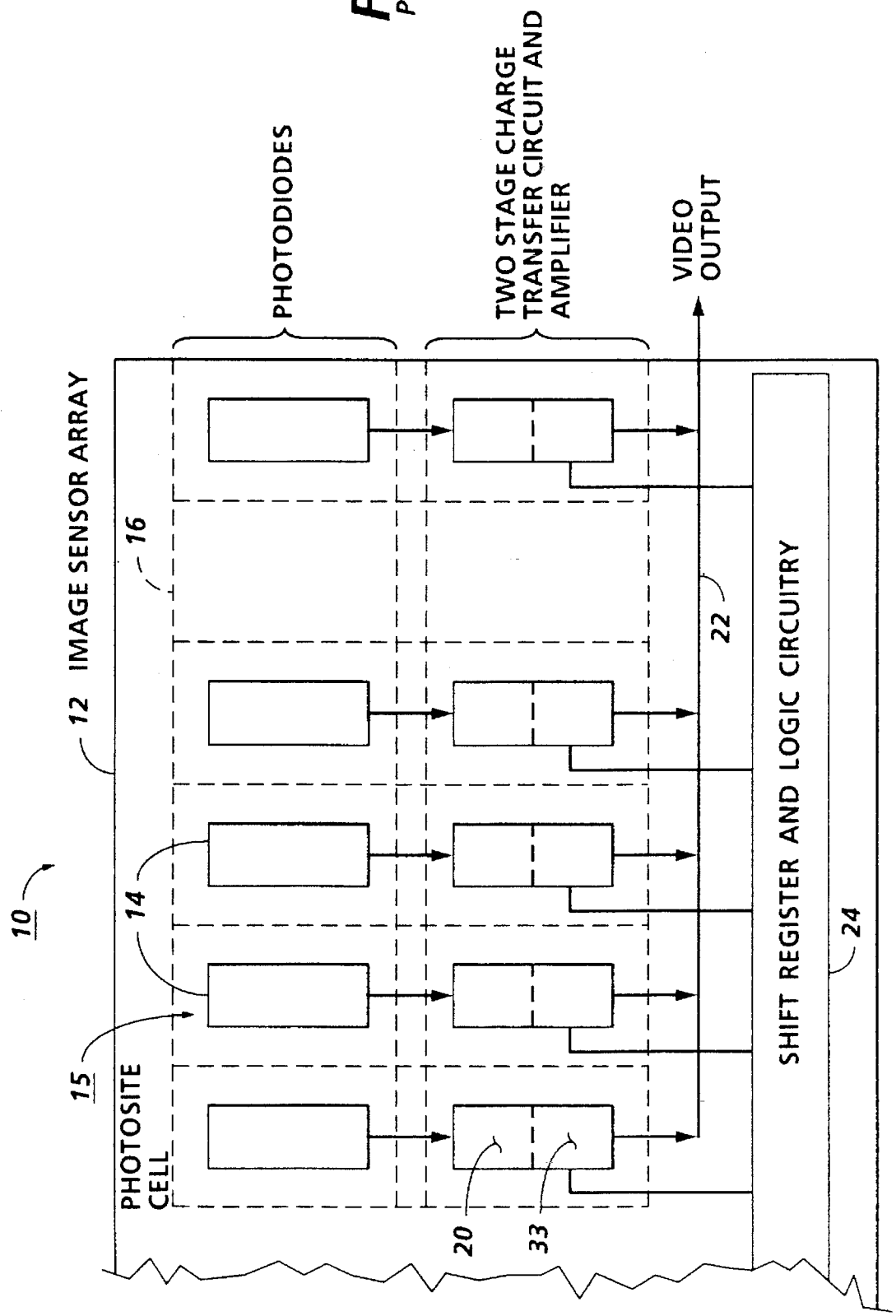
FIG. 1 is a schematic view of an image scanning array having an array of photosite cells, each cell having a photodiode with two stage transfer circuit and amplifier for transferring image signal charges from the photodiodes to a common output bus and incorporating the uniformity enhancing features of the present invention.

Referring to FIG. 1, there is shown the image sensor array with two stage transfer, designated generally by the numeral 10, of the type to which the present invention is directed. Image sensor array 10 includes a base or chip 12 of silicon with a plurality of photosites in the form of photodiodes 14 thereon. Photodiodes 14 are in closely spaced juxtaposition with one another on chip 12 in a linear array or row 16. Several smaller arrays such as array 10 can be abutted together end to end with one another to form a longer array, i.e. a full width or contact array, with spacing between the photodiodes at the butted ends the same as the spacing between the photodiodes inside the chip thereby maintaining photodiode pitch across the entire full width of the composite array.

While photodiodes 14 are shown and described herein, other photosite types such as amorphous silicon or transparent electrode MOS type photosites may be envisioned. Further, while a one dimensional sensor array having a single row 16 of photodiodes 14 is shown and described herein, a two dimensional sensor array with plural rows of photodiodes may be contemplated.

Each photodiode 14 has a two stage transfer circuit 20 associated therewith which together with the photodiode and an amplifier 33 form a photosite cell 15 at the array front end. In each cell 15, the image signal charge from the photodiode is transferred by circuit 20 to amplifier 33 where the image signal charge from photodiode 14 is amplified to bring the image signal charge to a desired potential level prior to transferring the charge to a common video output line or bus 22. Suitable shift register and logic circuitry 24 provide timing control signals ΦPIXEL for connecting each pixel cell 15 to bus 22 in the proper timed sequence.

Image sensor array 10 may for example be used to raster scan a document original, and in that application, the document original and the sensor array 10 are moved or stepped relative to one another in a direction (i.e., the slow scan direction) that is normally perpendicular to the linear axis of array 10. At the same time, the array scans the document original line by line in the direction (i.e., the fast scan direction) parallel to the linear axis of the array. The image line being scanned is illuminated and focused onto the photodiodes 14. During an integration period, a charge is developed on each photodiode proportional to the reflectance of the image area viewed by each photodiode. The image signal charges are thereafter transferred by two stage transfer circuits 20 via amplifier 33 to output bus 22 in a predetermined step by step timed sequence.

In the ensuing description, all transistors shown are N-channel type. However, P-channel transistors may instead be used with appropriate voltage level changes as will be understood.

Figure 2:
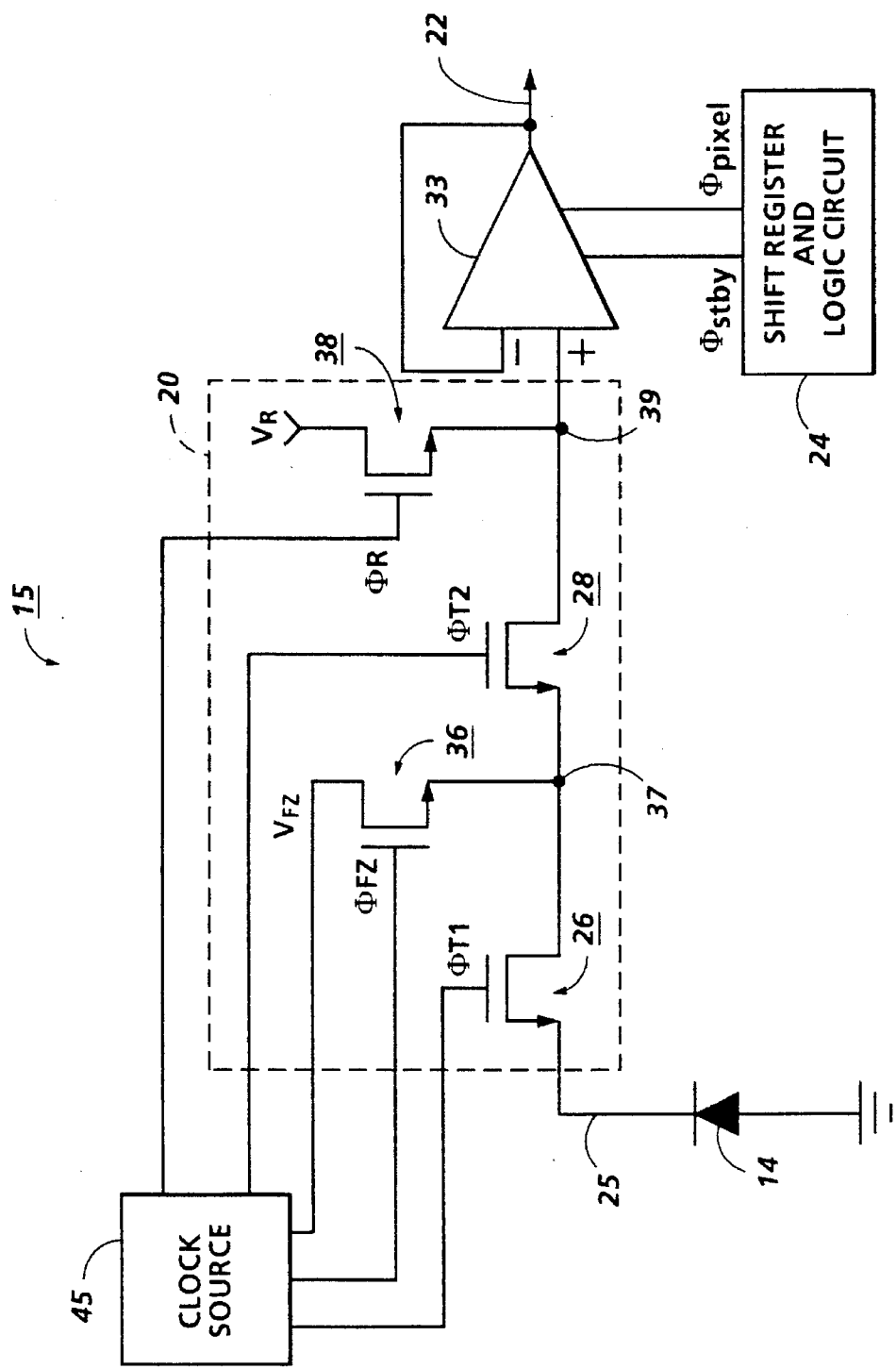
FIG. 2 is a circuit schematic showing a photosite cell and the amplifier with a transfer circuit.
Figure 3:
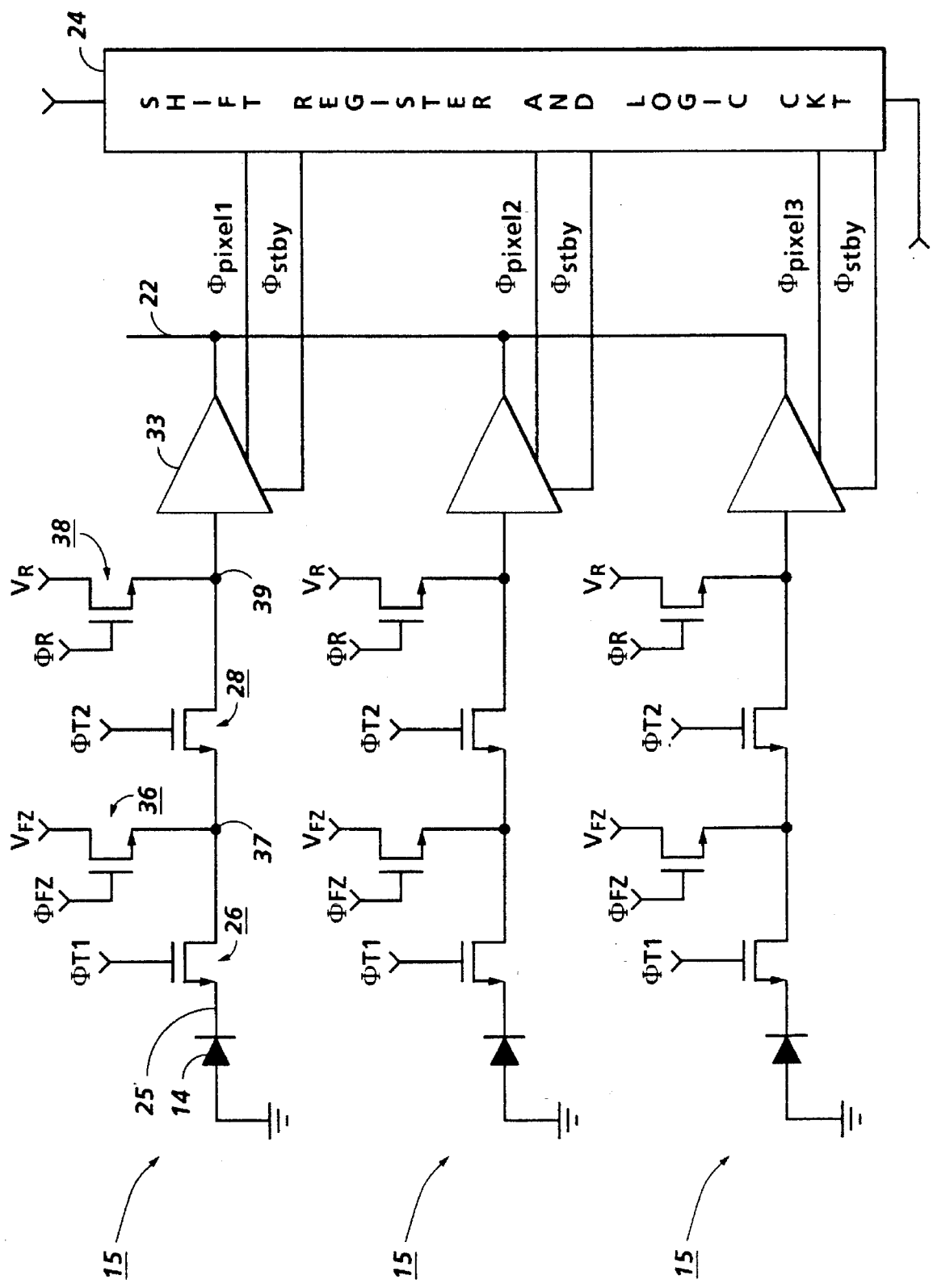
FIG. 3 is a schematic view depicting an array of photosite cells.
Figure 4:
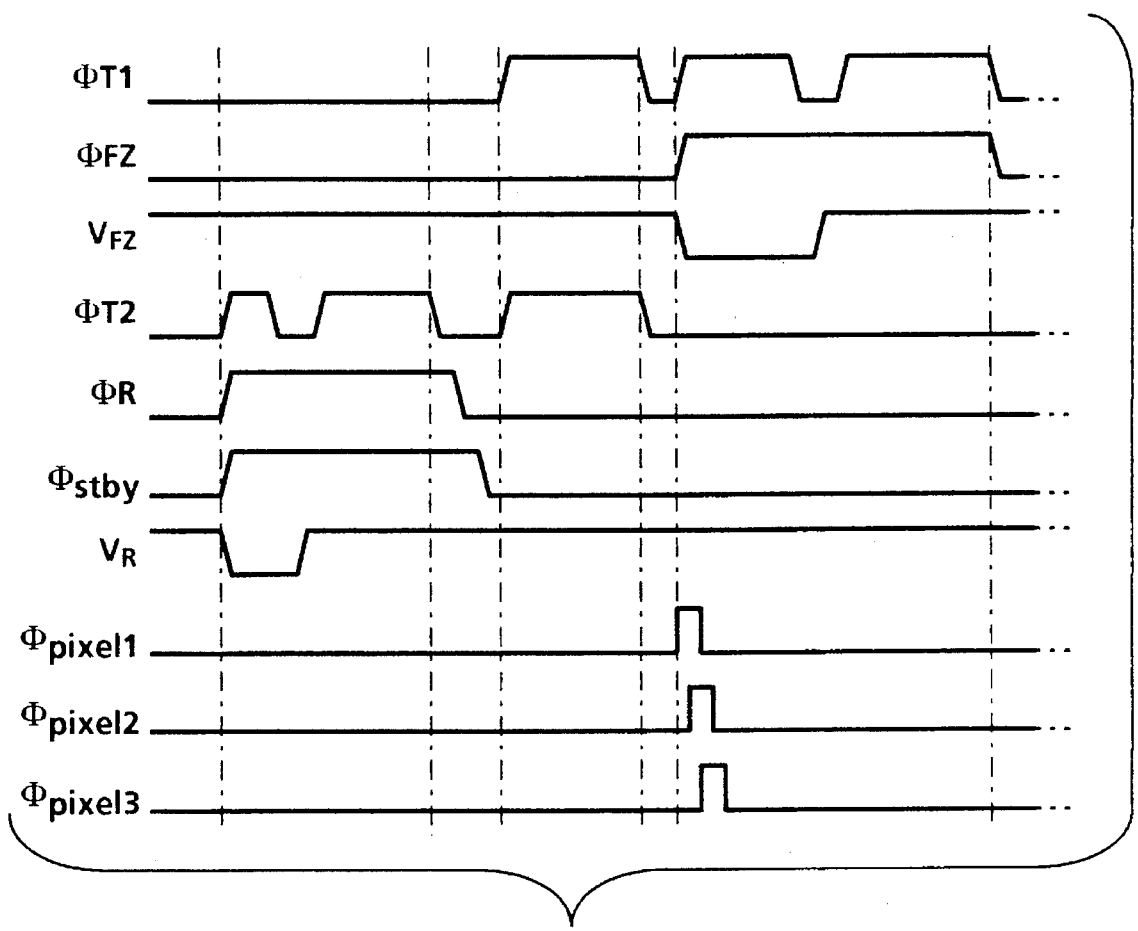
FIG. 4 is a timing diagram showing various voltage pulse waveforms for the transfer circuit shown in FIGS. 2 and 3, and with the amplifier of the present invention.

Referring particularly to FIGS. 2–4, the two stage transfer circuit 20 associated with each cell 15 has first and second stage transfer transistors 26, 28 for transferring the image signal charge from the photodiode 14 to amplifier 33. Transistors 26, 28 are in series with line 25 connecting one electrode of photodiode 14 with the input gate of amplifier 33. The other electrode of photodiode 14 is grounded.

A bias charge injection transistor 36 is provided to inject a bias charge, for example, an electrical fat zero $V_{FZ}$, to line 25 at middle node 37. Positioning transistor 36 between transistors 26, 28 and selecting the proper clock voltage levels allows transistor 26 to determine the surface potential during both the bias charge injection and charge transfer phases. As a result, the amount of bias charge injected is not dependent on the thresholds of transistors 36 and 26. This eliminates non-uniformities caused by transistor threshold variations from cell to cell while maintaining the high transfer efficiency provided by two stage transfer. A reset transistor 38 controls the reset voltage $V_R$ at the node 39 between transistor 28 and amplifier 33.

A suitable clock source 45 provides pulses $\Phi_R$, $\Phi_{T1}$, $\Phi_{T2}$, $\Phi_{FZ}$, and $V_{FZ}$. Pulses $\Phi_{T1}$, $\Phi_{FZ}$, and $V_{FZ}$ provide for injection of the bias charge into line 25, and pulses $\Phi_{T2}$ and $\Phi_R$ for injection of bias charge at node 37 and injection of the reset voltage $V_R$ to line 25 at node 39. As will appear, pulses $\Phi_{T1}$ and $\Phi_{T2}$, intended to have different voltage amplitudes, are provided for transferring the image signal charges from photodiodes 14 to amplifiers 33. The $\Phi_{pixel}$ signals for multiplexing the amplified charge output by amplifier 33 onto the common video output bus 22 are provided by shift register and logic circuitry 24.

In operation and referring particularly to FIGS. 2–4, pulse $\Phi_R$ actuates reset transistor 38 and $\Phi_{T2}$ actuates transistor 28 to apply a "fill" and "spill" to node 37 with voltage $V_R$. A reset voltage $V_R$ is then applied to node 39 to reset the input to amplifier 33. Subsequently, pulses $\Phi_{T1}$ and $\Phi_{T2}$ actuate transistors 26 and 28 respectively of two stage transfer circuit 20 to transfer the image signal charge accumulated on the photodiodes 14 of each cell 15 to amplifiers 33. Then, to read out the video signals from the various amplifiers onto the video bus in an orderly manner, signal pulses $\Phi_{pixel1}$, $\Phi_{pixel2}$, and $\Phi_{pixel3}$ activate the respective amplifiers in quick succession.

After the image signal has been transferred to the reset node input of the amplifier, the photodiodes can be reset and biased for the next light integration period. This can occur during the readout of the amplifiers. During injection of the bias charge, the $\Phi_{T1}$ and $\Phi_{FZ}$ pulses go high while pulse $V_{FZ}$ goes low for the "fill" of the photodiode, and then $V_{FZ}$ goes high for the "spill" of the photodiode. Following preset intervals, the "spill" is complete and pulses $\Phi_{T1}$ and $\Phi_{FZ}$ return to their nominal level.

Figure 5:
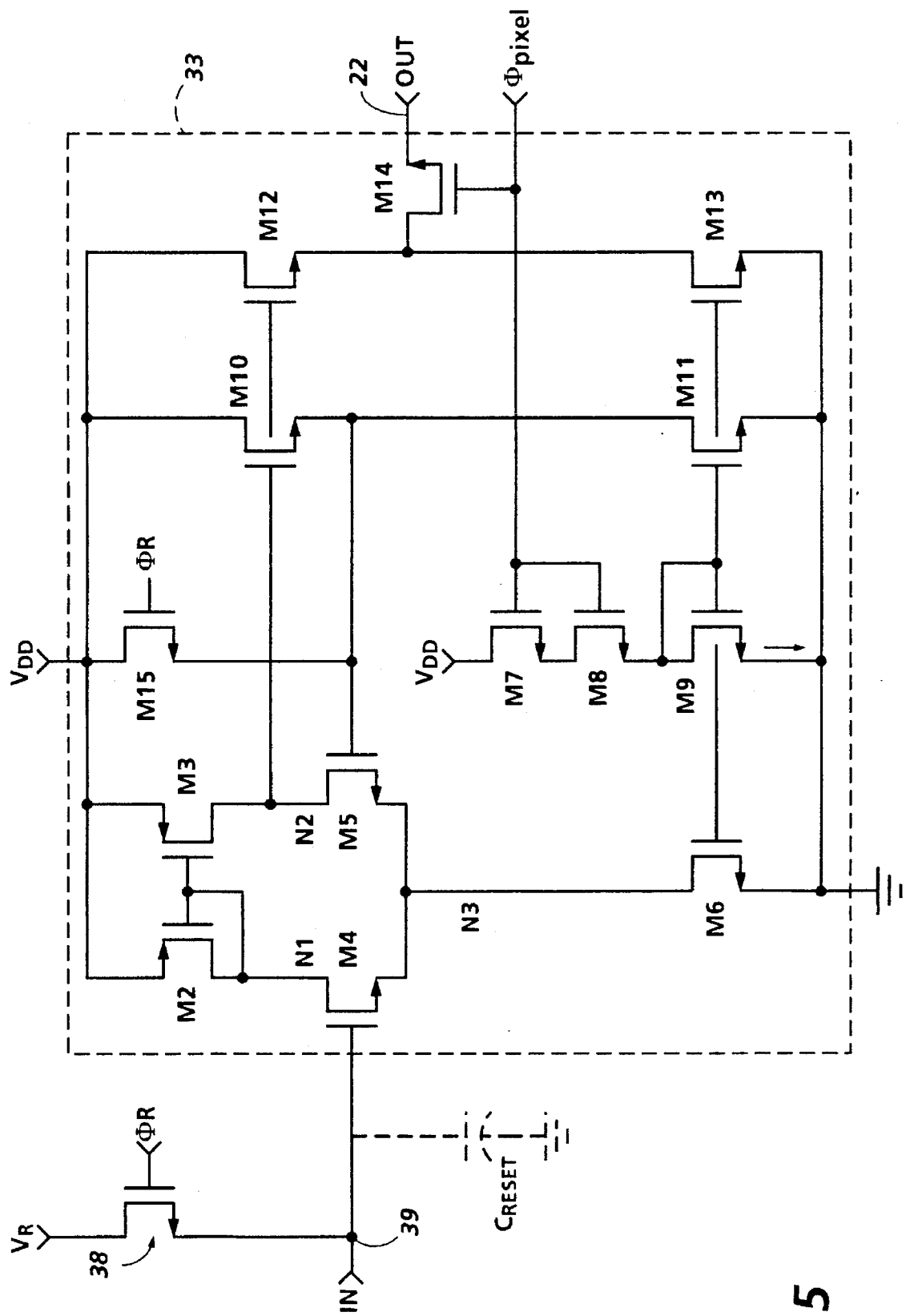
FIG. 5 is a schematic diagram of a basic amplifier circuit as could be used in the sensor array of FIG. 1–3.
Figure 6:
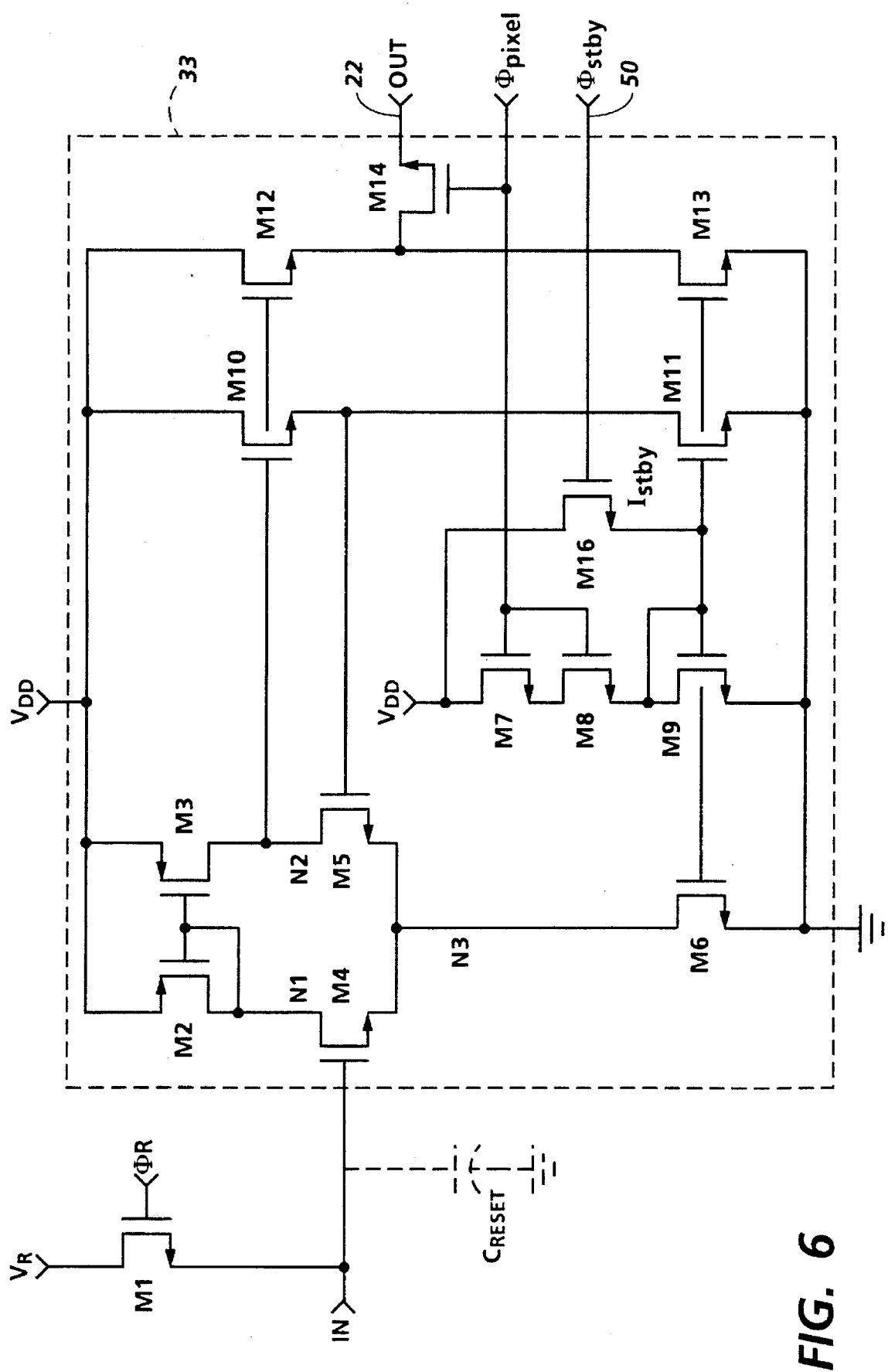
FIG. 6 is a schematic diagram of an amplifier circuit according to the present invention.

Having explained the general operation of the means by which image signals are transferred from photodiode 14 through transfer circuit 20 to amplifier 33, attention is now directed to FIGS. 5 and 6, which respectively are schematic circuit diagrams of the basic design of an amplifier for use in the sensor array described above, and a schematic circuit diagram of an amplifier including the present invention. In both FIGS. 5 and 6, like reference numerals indicate like elements. In both cases, with every scan cycle wherein a charge transferred from photodiode 14 is placed on node 39, the signal charge is transferred to the input of amplifier 33 where it is converted into a voltage by a parasitic capacitance shown as $C_{RESET}$ in the Figures.

The amplifier as a whole is indicated as 33, and, as mentioned above, it is operatively interposed as a unity-gain amplifier between node 39 and the common video output bus 22. The essential parts of amplifier 33 include a differential pair, indicated by the arrangement of transistors M2–M5. The current source for the differential pair is indicated as transistor M6. Amplifier 33 further includes a source follower, indicated by the line on which transistor M10 is disposed, and which uses transistor M11 as a current source. There is also provided a source follower indicated by the line having transistor M12, with current source from transistor M13. As can be further seen in FIG. 5, the ultimate power source for the transistors M6, M11 and M13 is the VDD source controlled by transistors M7, M8, and M9, the first two of which are controlled by a pixel signal from shift register 24, in a manner described above. In turn, the transistor M15, which is also connected to voltage source VDD, is controlled by the same waveform $\Phi_R$ which operates with transistor 38. The $\Phi_{pixel}$ line for the amplifier also affects the video out signal on line 22 through transistor M14.

A succession of discrete pixel signals from a photodiode 14 are passed in sequence through amplifier 33, each discrete pixel signal relating to a small area on the hard-copy image being scanned, and with the value of one discrete signal being independent from all other signals in the sequence. With every new scan cycle (i.e., whenever a new discrete signal is sent from node 39 through the amplifier 33 to output bus 22) the charges left on the transistors M2–M5 are not always predictably cleared of residual charges resulting from the previous signal. In particular, spurious residual charges tend to remain at the nodes marked N1, N2, and N3 in FIG. 5. The presence of these residual charges at these nodes will inevitably have an effect on the inherent properties of the various transistors during the next scan cycle, when another signal unrelated to the previous signal is passed through the amplifier 33. It is therefore desirable to provide a system in which residual charges on the transistors within the amplifier can be eliminated, or at least reset to known values, with every scan cycle, so that charges left over from a previous signal will not have an effect on the output of a subsequent signal.

FIG. 6 is a schematic circuit diagram of an improved amplifier according to the present invention. In addition to the basic elements shown in the amplifier of FIG. 5, the circuit further includes a line 50, operative on a transistor M16, which serves a similar purpose as transistors M7 and M8. The purpose of standby line 50 is to facilitate, with each scan cycle of the amplifier 33, a reset period for the amplifier itself, in which a relatively small standby current $\Phi_{stby}$ induced through transistor M16 by a signal $\Phi_{stby}$ allows the transistors in amplifier 33, particularly transistors M2–M5 in the difference pair, to reset to known starting values in preparation for accepting and amplifying the next pixel signal from node 39. All amplifiers in the linear array may be reset at once.

Returning to the timing diagram of FIG. 4, the function of the standby signal $\Phi_{stby}$ is shown in comparison with the other waveforms carrying out the transfer of signals from photodiode 14 to the amplifier 33, described in detail above. As shown, the signal $\Phi_{stby}$ is intended to begin at the same time as the reset signal $\Phi_R$ which resets the input to amplifier 33. The combination of pulse $\Phi_R$ and standby signal $\Phi_{stby}$ causes nodes N1, N2, and N3 to settle to known values independent of their previous values after the $\Phi_R$ signal, as shown in FIG. 4, returns to the low state. Generally, it has been found that the current for $\Phi_{stby}$ can be relatively low, as little as 1/50th that of the $\Phi_{pixel}$ current. A low current maintains a lower power consumption for the whole device.

Given a practical system in which every cell 15 is placed in a staggered 128 clock cycle for outputting a signal from its photosite 14, a relative timing is as follows. Given a 128 clock cycle, one clock of the cycle is required for the cell to actually output a signal from amplifier 33. On this scale, a typical duration of the low standby current for $\Phi_{stby}$ is approximately 14 clocks. This period of time has been shown to be adequate to reset the amplifier for every scan cycle.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. A photosensor array comprising:

a plurality of photodiodes;

an amplifier associated with each photodiode, the amplifier including a standby transistor and an internal node associated with the standby transistor;

a transfer circuit associated with each photodiode for transferring a charge on the photodiode to a reset node interposed between the photodiode and the amplifier;

serial readout means for selectably causing an amplifier to output a charge from the reset node as an output signal;

means for applying a reset voltage to the reset node to reset the amplifier for transfer of a charge from the photodiode to the amplifier; and means for applying a standby signal to the standby transistor in the amplifier, the standby signal on the standby transistor causing the internal node to settle to a predetermined charge level before a subsequent transfer of a charge from the photodiode to the amplifier.

2. The array of claim 1, wherein the standby signal applying means is adapted to initiate the standby signal substantially simultaneously with a reset voltage applied by the reset voltage applying means.

3. The array of claim 1, wherein the standby signal applying means is adapted to stop applying the standby signal after the reset voltage applying means stops applying the reset voltage.

4. The array of claim 1, the amplifier including a differential pair and a current source transistor for the differential pair, the standby transistor being operatively associated with the current source transistor, and wherein the standby signal applied to the standby transistor causes a node within the differential pair to settle to a predetermined charge level.

5. A method of operating a photosensor array including a plurality of photodiodes, an amplifier associated with each photodiode, the amplifier including a standby transistor and an internal node associated with the transistor, a transfer circuit associated with each photodiode for transferring a charge on the photodiode to a reset node interposed between the photodiode and the amplifier, and serial readout means for selectably causing an amplifier to output a charge from the node as an output signal, comprising the steps of:

applying a reset voltage to the reset node to reset the amplifier for transfer of a charge from from the photodiode to the amplifier;

applying a standby signal to the standby transistor in the amplifier, the standby signal on the standby transistor causing the internal node to settle to a predetermined charge level before a subsequent transfer of a charge from the photodiode to the amplifier;

transferring a charge on the photodiode to the reset node; and causing an amplifier to output a charge from the reset node as an output signal in response to the serial readout means.

6. The method of claim 5, wherein the standby signal applying step begins substantially simultaneously with the reset voltage applying step.

7. The method of claim 5, wherein the standby signal applying step is ended after the reset voltage applying step is ended.

8. The method of claim 5, wherein the amplifier includes a differential pair and a current source transistor for the differential pair, the standby transistor being operatively associated with the current source transistor, and wherein the standby signal applying step causes a node within the differential pair to settle to a predetermined charge level.

* * * * *